United States Patent
Cheong et al.

(10) Patent No.: US 10,998,583 B1
(45) Date of Patent: May 4, 2021

(54) COMPOSITE SOLID ELECTROLYTE WITHOUT SELF-DISCHARGE, BATTERY UNIT CELL HAVING SAME, AND METHOD OF MANUFACTURING COMPOSITE SOLID ELECTROLYTE

(71) Applicant: AGENCY FOR DEFENSE DEVELOPMENT, Daejeon (KR)

(72) Inventors: Hae-Won Cheong, Daejeon (KR); Min-U Kim, Daejeon (KR); Sung-Ho Kang, Daejeon (KR); Jang-Hyeon Cho, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 16/878,903

(22) Filed: May 20, 2020

(30) Foreign Application Priority Data

Dec. 5, 2019 (KR) .................. 10-2019-0160682

(51) Int. Cl.
| | | |
|---|---|---|
| *H01M 10/38* | (2006.01) | |
| *H01M 10/39* | (2006.01) | |
| *H01M 4/136* | (2010.01) | |
| *H01M 4/134* | (2010.01) | |
| *H01M 4/131* | (2010.01) | |

(Continued)

(52) U.S. Cl.
CPC ......... *H01M 10/399* (2013.01); *H01M 4/131* (2013.01); *H01M 4/134* (2013.01); *H01M 4/136* (2013.01); *H01M 4/366* (2013.01); *H01M 4/405* (2013.01); *H01M 10/38* (2013.01); *H01M 2300/0022* (2013.01)

(58) Field of Classification Search
CPC .... H01M 10/399; H01M 10/38; H01M 4/131; H01M 4/134; H01M 4/136; H01M 4/366; H01M 4/405; H01M 4/38; H02M 2300/0022
See application file for complete search history.

(56) References Cited

U.S. PATENT DOCUMENTS

| 10,312,550 B2 | 6/2019 | Cheong et al. |
| 2016/0072153 A1 | 3/2016 | Ichikawa et al. |

(Continued)

FOREIGN PATENT DOCUMENTS

| JP | 2017-174827 A | 9/2017 |
| KR | 10-1121544 B1 | 3/2012 |

(Continued)

OTHER PUBLICATIONS

Langer et al., Microstructure and temperature dependent lithium ion transport of ceramic-polymer composite electrolyte for solid-state lithium ion batteries based on garnet-type Li7La3Zr2O12, Solid State Ionics, vol./Issue 291, pp. 8-13 (Year: 2016).*

*Primary Examiner* — Jayne L Mershon
(74) *Attorney, Agent, or Firm* — LRK Patent Law Firm

(57) ABSTRACT

A composite solid electrolyte where self-discharge at room temperature is fundamentally prevented by adding a molten salt powder, which is an electric insulator at room temperature, or applying a molten salt passivation layer. The composite solid electrolyte includes: molten salt powder particles having electrical insulating properties at room temperature; and solid electrolyte powder particles on which surfaces thereof the molten salt powder particles are combined.

8 Claims, 6 Drawing Sheets

(51) Int. Cl.
    *H01M 4/40*     (2006.01)
    *H01M 4/36*     (2006.01)

(56) References Cited

U.S. PATENT DOCUMENTS

| | | | | |
|---|---|---|---|---|
| 2016/0093915 | A1* | 3/2016 | Yamamoto | H01M 10/0525 429/126 |
| 2020/0212483 | A1* | 7/2020 | Kuppan | C04B 35/48 |
| 2020/0343577 | A1* | 10/2020 | Park | H01M 10/42 |

FOREIGN PATENT DOCUMENTS

| | | |
|---|---|---|
| KR | 10-2016-0002693 A | 1/2016 |
| KR | 10-2016-0013630 A | 2/2016 |
| KR | 10-1739803 B1 | 6/2017 |
| KR | 10-1750203 B1 | 7/2017 |

\* cited by examiner

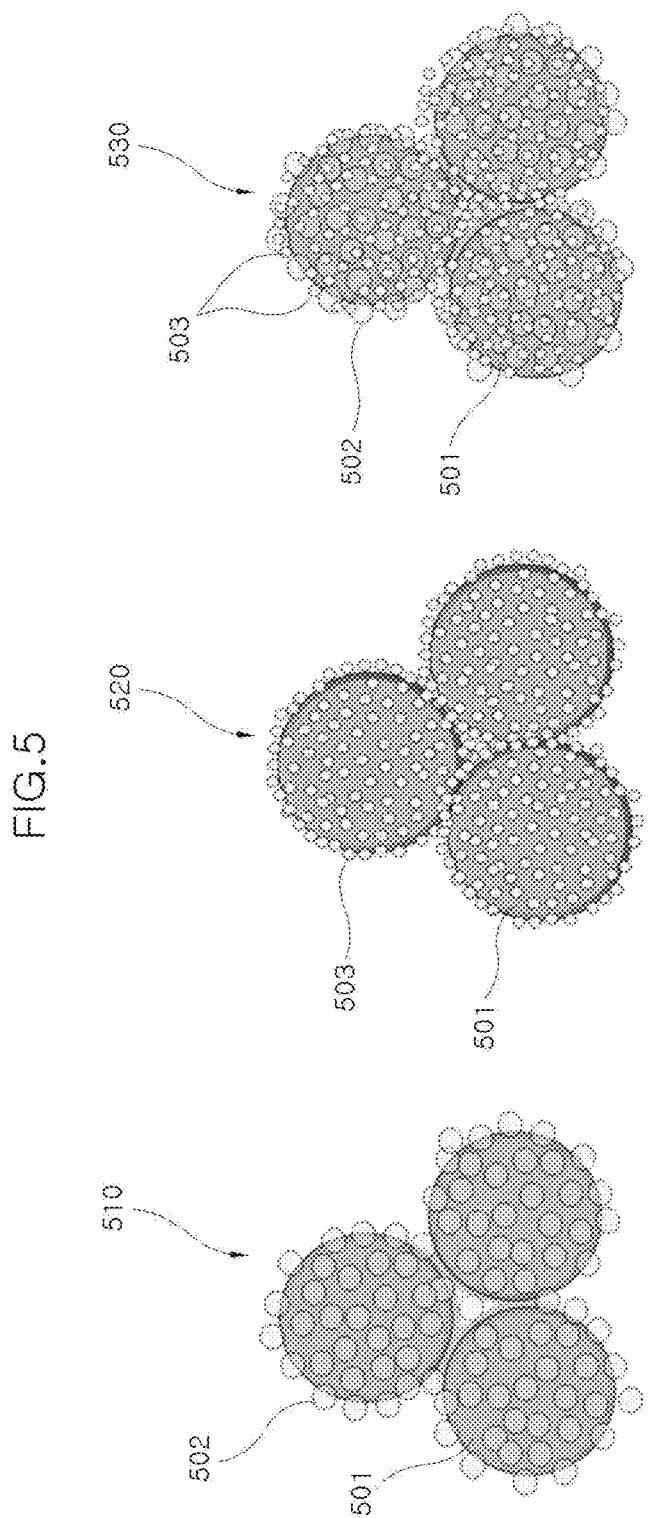

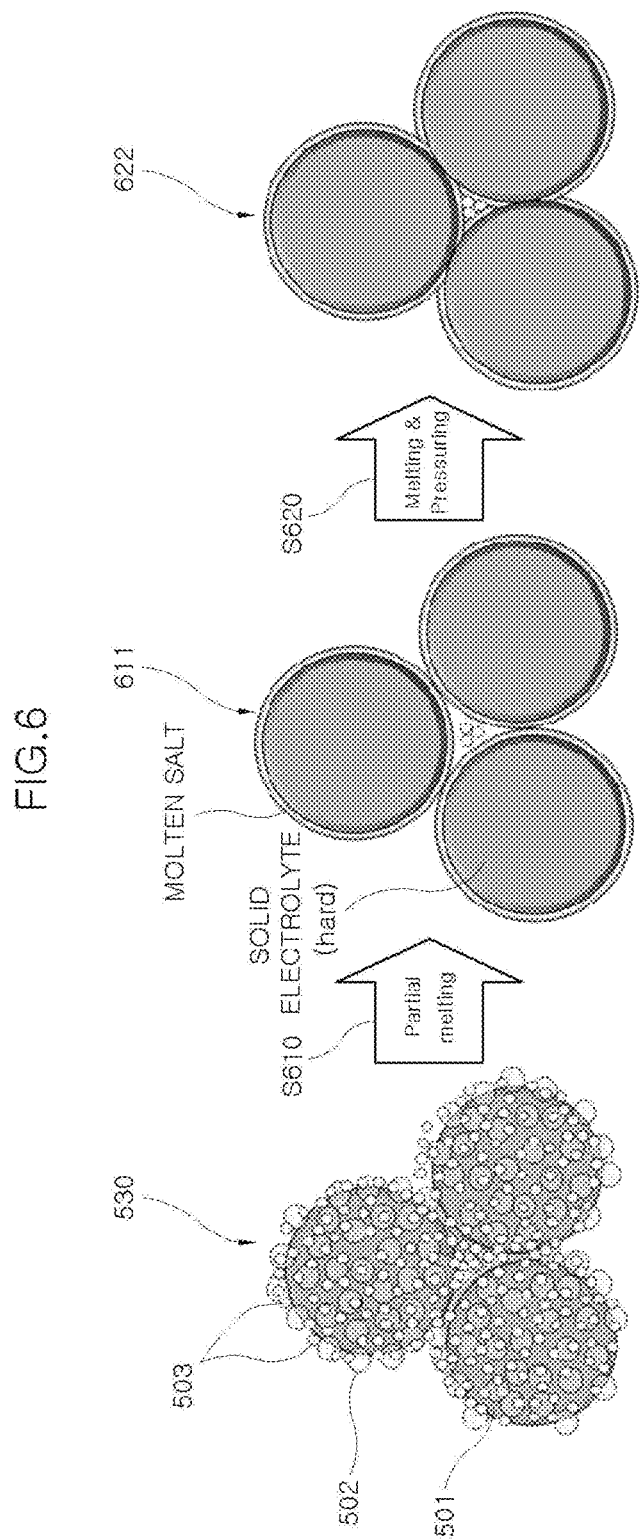

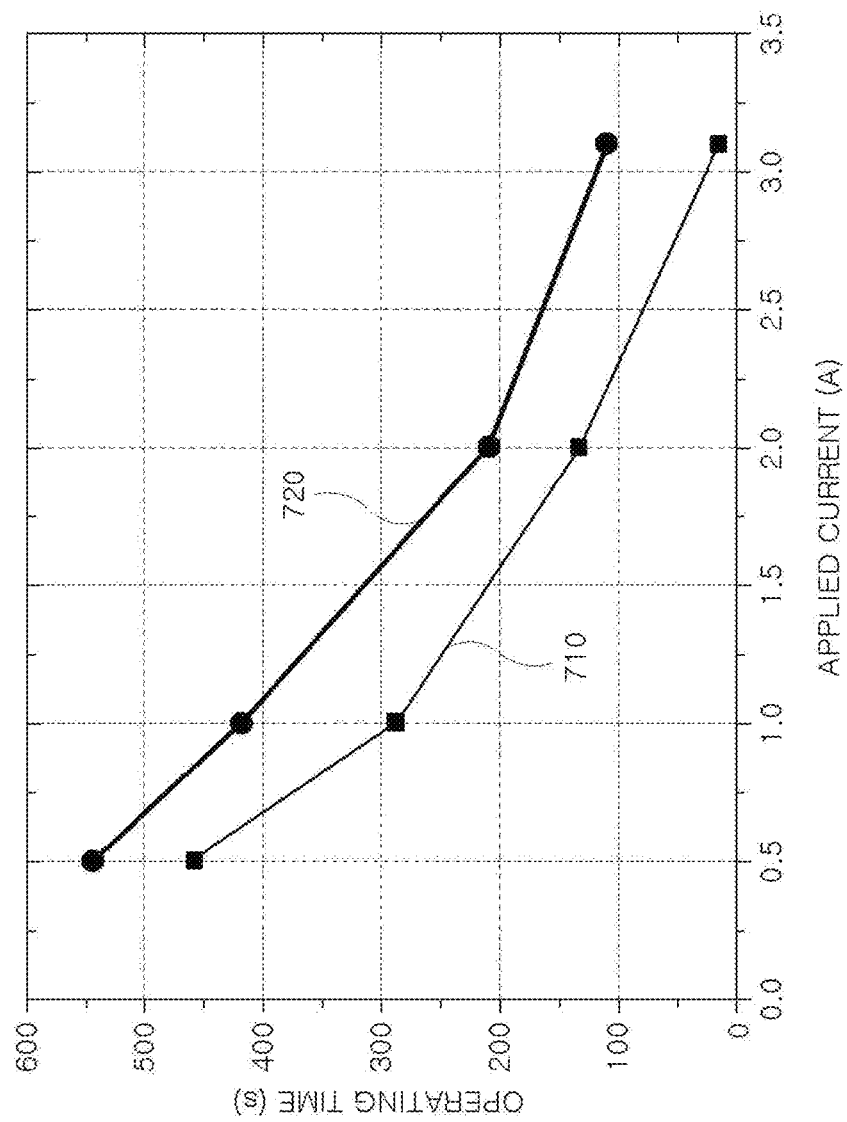

COMPOSITE SOLID ELECTROLYTE WITHOUT SELF-DISCHARGE, BATTERY UNIT CELL HAVING SAME, AND METHOD OF MANUFACTURING COMPOSITE SOLID ELECTROLYTE

CROSS REFERENCE TO RELATED APPLICATION

The present application claims priority to Korean Patent Application No. 10-2019-0160682, filed Dec. 5, 2019, the entire contents of which is incorporated herein for all purposes by this reference.

BACKGROUND OF THE INVENTION

1. Field of the Invention

The present invention relates generally to a solid electrolyte. More particularly, the present invention relates to a composite solid electrolyte, wherein self-discharge at room temperature is fundamentally prevented by adding a molten salt powder, which is an electric insulator at room temperature, or applying a molten salt passivation layer, and relates to a method of manufacturing the same The present invention further relates to a high-temperature-operating type composite solid electrolyte capable of greatly improving ion conductivity and operational stability, and relates to a method of manufacturing the same.

2. Description of Related Art

A high-temperature battery, such as a thermal battery, starts operating as a battery while an electrically insulating molten salt electrolyte melts by a pyrotechnic heat source or the like and becomes ionically conductive. At this time, an electrically insulating oxide binder (MgO or the like) is added to the molten salt electrolyte. However, when the amount of added binder is small, the molten salt electrolyte may easily melt and flow at a high operating temperature (~500° C.) of the thermal battery, thereby contributing to causing a short-circuit between electrodes or depletion of the molten salt.

To prevent this, increasing the amount of added electrically insulating binder may be adopted. This may increase operational stability of the battery, but there is a problem in that internal resistance may increase and output may decrease thereby. The stability problem can be alleviated by using a solid electrolyte sintered disk having excellent ion conductivity, but there is still a problem in that discharge output may be limited due to ion conductivity of the solid electrolyte which is very low compared to the molten salt.

In particular, in order to obtain a solid electrolyte sintered disk having a high sintering density and a desired stoichiometric composition, complicated and expensive methods, such as hot pressing using atmospheric powder, hot isostatic pressing, and spark plasma sintering, are mainly used. However, the solid electrolyte sintered disk, which is very fragile, is required to be processed to a desired dimension, and thus there is a disadvantage in that manufacturing costs may be increased due to a complicated and low yield process. Additionally, when the sintered disk is manufactured by simply molding solid electrolyte powder, there is a problem in that internal resistance of the battery may increase due to a very high interface resistance and output may be limited thereby. Furthermore, the solid electrolyte may be difficult to put into practical use due to low molding strength and yield.

Moreover, the solid electrolyte has a relatively high electrical conductivity (about $10^{-2}$ to $10^{-5}$ S/cm) even at room temperature and thus is disadvantageous in that self-discharge cannot be avoided. That is, in most batteries, internal chemical reactions reduce the capacity of the battery even when no electrical load is connected. This phenomenon is called self-discharge.

SUMMARY OF THE INVENTION

Accordingly, the present invention has been made keeping in mind the above problems occurring in the related art, and an objective of the present invention is to provide a composite solid electrolyte, wherein self-discharge at room temperature is fundamentally prevented by adding a molten salt powder, which is an electric insulator at room temperature, or applying a molten salt passivation layer, to provide a method of manufacturing the same.

Another objective of the present invention is to provide a high-temperature operating type composite solid electrolyte capable of greatly improving ion conductivity and operational stability, and relates to a method of manufacturing the same.

In order to achieve the above objectives, according to one aspect of the preset invention, there is provided a composite solid electrolyte, wherein self-discharge at room temperature is fundamentally prevented by adding a molten salt powder, which is an electric insulator at room temperature, or applying a molten salt passivation layer.

The composite solid electrolyte may include:
molten salt powder particles having electrical insulating properties at room temperature; and
solid electrolyte powder particles on which surfaces thereof the molten salt powder particles are combined.

Here, a composition ratio of the molten salt powder particles may be 30 to 80 wt. % and a composition ratio of the solid electrolyte powder particles may be 20 to 70 wt. %.

Furthermore, the molten salt powder particles may include at least one of first molten salt powder particles and second molten salt powder particles smaller in size than the first molten salt powder particles.

Furthermore, the first molten salt powder particles may have a size of about +50 to −200 mesh.

Furthermore, the second molten salt powder particles may have a size of about −325 mesh.

Furthermore, the molten salt powder particles may be mixed with the solid electrolyte powder particles in a form of an aqueous molten salt solution and then dried to be combined with the solid electrolyte powder particles.

Furthermore, the molten salt powder particles may be melted in a form of a salt film to be coated on the surfaces of the solid electrolyte powder particles.

Furthermore, the molten salt powder particles may be added in powder form to be interposed between the solid electrolyte powder particles.

Furthermore, the solid electrolyte may have a thickness of 0.05 to 1.0 mm.

Furthermore, the molten salt powder particles may become a molten salt electrolyte having conductivity when a pyrotechnic heat source layer is activated and thereby temperature rises equal to or greater than a melting point.

Furthermore, the molten salt powder particles and the solid electrolyte powder particles may be mixed and subjected to warm uniaxial pressing at a temperature equal to or less than a melting pout of the molten salt.

On the other hand, according to another aspect of the present invention, there is provided a thermal battery unit cell, including: a current collector layer; an anode layer is formed on top of the current collector layer, a composite solid electrolyte layer formed on top of the anode layer; a cathode layer formed on top of the composite solid electrolyte layer; and a pyrotechnic heat source layer formed on top of the cathode layer, wherein the composite solid electrolyte layer may include molten salt powder particles having electrical insulating properties at room temperature, and solid electrolyte powder particles on which surfaces thereof the molten salt powder particles are combined.

Here, the anode layer may be made of at least one of a lithium alloy and a lithium-iron mixture.

Furthermore, the cathode layer may be made of any one of sulfide, fluoride, and oxide.

On the other hand, according to still another aspect of the present invention, there is provided a method of manufacturing a composite solid electrolyte, the method including: (a) preparing molten salt powder particles having electrical insulating properties at room temperature, and solid electrolyte powder particles; and (b) combining the molten salt powder particles on surfaces of the solid electrolyte powder particles to produce composite solid electrolytes.

Further, on the other hand, according to still another aspect of the present invention, there is provided a method of manufacturing a composite solid electrolyte, the method including: (a) preparing molten salt powder particles having electrical insulating properties at room temperature, and solid electrolyte powder particles; (b) dissolving molten salt powder particles by adding a liquid solute which is water or an organic solvent to produce a solution; and (c) mixing the solid electrolyte powder particles into the solution, followed by drying to produce composite solid electrolytes.

According to the present invention, it is possible to realize a high-temperature operating type electrolyte, wherein self-discharge is fundamentally prevented by isolating the surface of the solid electrolyte powder with the molten salt as an electrical insulator at room temperature, and further ion conductivity is increased by using the solid electrolyte as a binder instead of a conventional insulating binder.

Another effect of the present invention is that the battery capacity does not decrease even during long term storage at room temperature, and that the stability and output problems of the battery can be solved simultaneously during operation at high temperature.

Another effect of the present invention is that when the solid electrolyte powder is mixed and molded with the molten salt and used as an electrolyte, manufacturing costs can be lowered.

Still another effect of the present invention is that stability and ion conductivity can be greatly improved.

BRIEF DESCRIPTION OF THE DRAWINGS

The above and other objectives, features, and other advantages of the present invention will be more clearly understood from the following detailed description when taken in conjunction with the accompanying drawings, in which:

FIG. 5 is a conceptual view illustrating the types of composite solid electrolytes in which molten salt and solid electrolyte are combined;

FIG. 6 is a view illustrating a process of producing a composite solid electrolyte according to an embodiment of the present invention; and FIG. 7 is a view illustrating an example of comparing the discharge characteristics of a solid electrolyte molten salt according to an embodiment of the present invention and a conventional binder (MgO)-molten salt.

DETAILED DESCRIPTION OF THE INVENTION

Figure 1:
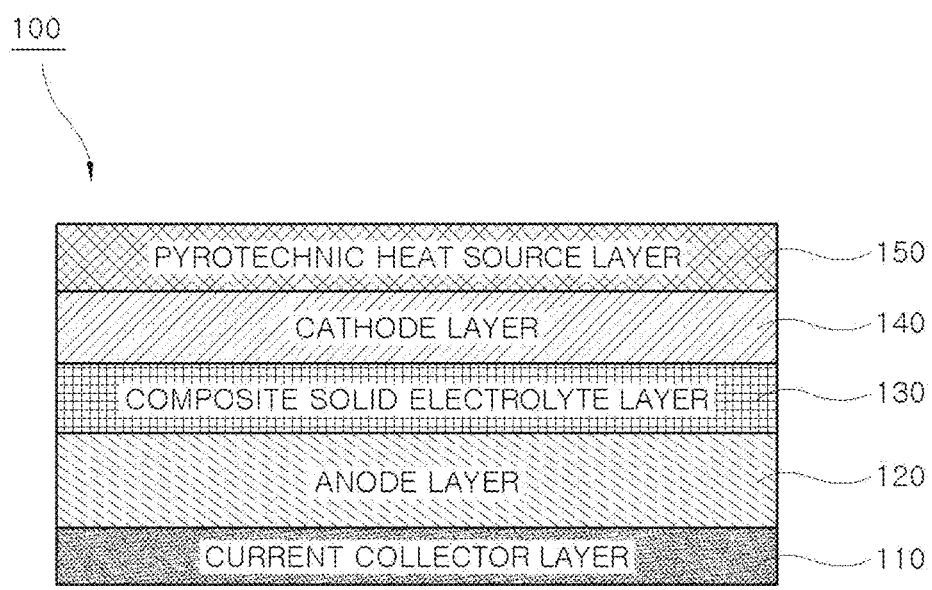
FIG. 1 is a conceptual view illustrating a battery unit cell according to an embodiment of the present invention.

Hereinafter, a composite solid electrolyte without self-discharge, a battery unit cell having the same, and a method of manufacturing the s composite solid electrolyte associated with the present disclosure will be described in more detail with reference to the accompanying drawings. Even in different embodiments according to the present disclosure, the same or similar reference numerals are designated to the same or similar configurations, and the description thereof will be substituted by the earlier description. As used herein, the singular forms are intended to include the plural forms as well, unless the context clearly indicates otherwise.

FIG. 1 is a conceptual view illustrating a thermal battery unit cell 100 according to an embodiment of the present invention. Referring to FIG. 1, the thermal battery unit cell 100 may be configured to include a current collector layer 110, an anode layer 120, a composite solid electrolyte layer 130, a cathode layer 140, and a pyrotechnic heat source layer 150. The current collector layer 110 is a thin metal plate (i.e., foil) and may be made of stainless steel, iron, aluminum, aluminum alloy, copper, copper alloy, nickel, nickel alloy, graphene, or the like. A nonwoven fabric made of metal fibers, a metal porous body sheet, or the like may also be used.

The anode layer 120 is formed on the current collector layer 110. The anode layer 120 may be an anode active material such as lithium alloy such as LiSi, LiAl, and LiB, and a lithium-iron mixture.

The composite solid electrolyte layer 130 is a solid electrolyte without self-discharge, and is a composite solid electrolyte in which molten salt is dispersed and distributed between electrolyte particles. Tat is, the composite solid electrolyte layer 130 performs a function of blocking ion exchange between the anode layer 120 and the cathode layer 140 when not in use so that self-discharge does not occur.

The cathode layer 140 may be a cathode active material such as sulfide such as $FeS_2$, $CoS_2$, and $NiS_2$, fluoride such as $FeF_3$, $CoF_3$, $LaF_3$, $ZrF_4$, $BiF_3$, and $NiF_3$, and oxide such as $CuV_2O_6$ and $Cu_2V_2O_7$.

The pyrotechnic heat source layer 150 serves to liquefy the composite solid electrolyte layer 130 in a solid state so that migration of electrons and ions occurs in the anode layer 120 and the cathode layer 140. Therefore, the pyrotechnic heat source layer 150 may be a heat pellet or the like, which is a heat source for activating the composite solid electrolyte layer 130.

Figure 2:
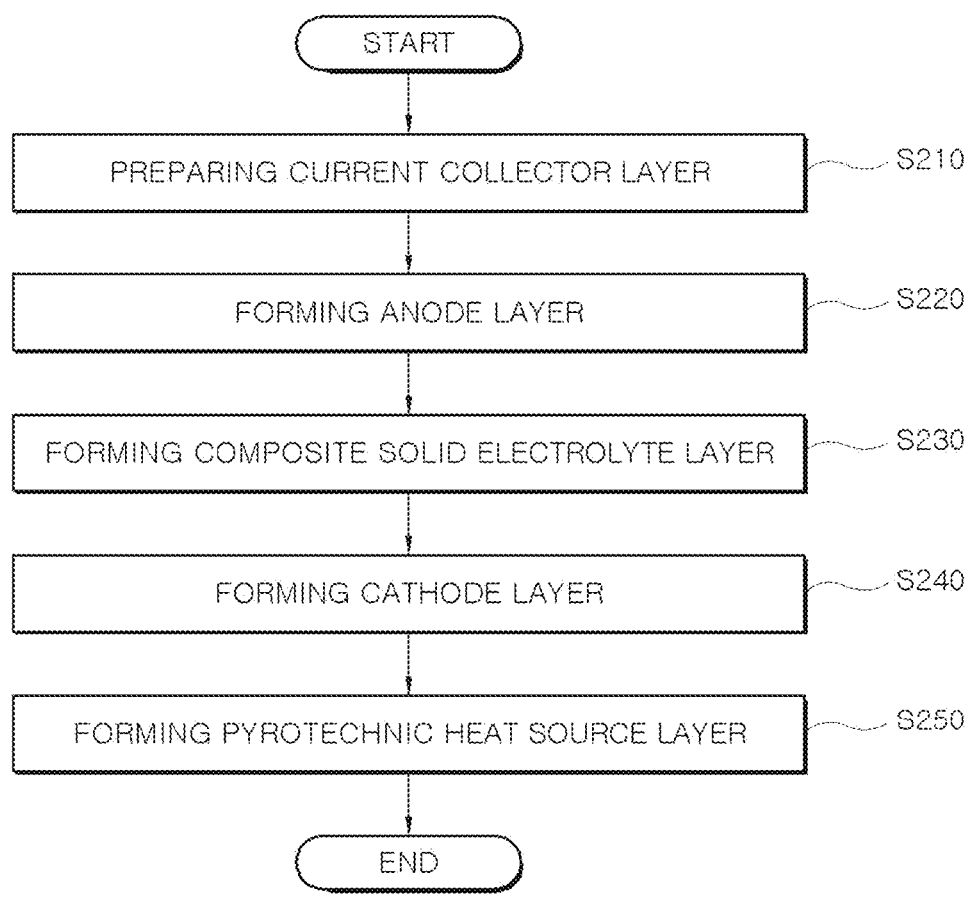
FIG. 2 is a process chart illustrating manufacturing steps of the battery unit cell illustrated in FIG. 1.

FIG. 2 is a process chart illustrating manufacturing steps of the battery unit cell 100 illustrated in FIG. 1. In detail, in FIG. 2, pellets (disk shape) made by powder-molding each component (anode/electrolyte/cathode/pyrotechnic heat source) excluding the current collector are stacked to manufacture a unit cell. A current collector is manufactured by punching a thin metal plate.

Referring to FIG. 2, a current collector layer 110 in a form of a thin metal plate is prepared (step S210). Thereafter, an anode layer 120 is molded using an anode active material in powder form, and then stacked on top of the current collector layer 110 (step S220). In addition to the anode active material, salt (LiCl—KCl) is added. Thereafter, a powder in which molten salt and solid electrolyte powder are mixed is molded, and then a resulting composite solid electrolyte layer 130 is stacked on top of the anode layer 120 (step S230).

Thereafter, a cathode layer 140 formed by molding a cathode active material in powder form is then stacked on top of the composite solid electrolyte layer 130 (step S240). In addition to the cathode active material, salt (LiCl—KCl), $Li_2O$, MgO, and the like are added. Thereafter, a pyrotechnic heat source layer 150 formed by powder molding a pyrotechnic heat source material in powder form is stacked on top of the cathode layer 140 (step S250). Finally, the powder forms are combined using a high-pressure molding press.

Figure 3:
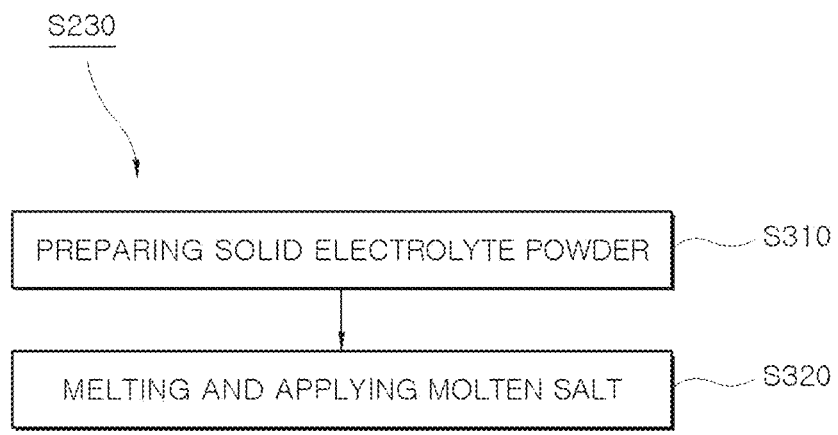
FIG. 3 is a view illustrating an example of a process chart illustrating a step of forming a composite solid electrolyte layer illustrated in FIG. 2.

FIG. 3 is a view illustrating an example of a process chart illustrating the step of forming a composite solid electrolyte layer (S230) illustrated in FIG. 2. Referring to FIG. 3, a solid electrolyte powder is prepared (step S310). As a solid electrolyte powder particle having excellent high-temperature stability, there may be a garnet-type solid electrolyte ($Li_7La_3Zr_2O_{12}$ (LLZO)), perovskit-type solid electrolyte ($Li_{0.33}La_{0.66}TiO_3$), lithium argyrodite-type solid electrolyte ($Li_{7-x}PS_{6-x}Cl_x$ ($0 \leq x \leq 1.75$)), Nasicon-type solid electrolyte (Na-ion conductive material having a composition of $Na_{1-x}Zr_2Si_2P_{3-x}O_{12}$ ($0 \leq x \leq 3$)), oxide-based electrolyte such as LISICON-type solid electrolyte ($\gamma$-$Li_3PO_4$) and other oxide-based solid electrolytes ($Li_2ZrO_3$) sulfide-based solid electrolyte such as lithium argyrodite-type solid electrolyte ($Li_{7-x}PS_{6-x}Cl_x$ ($0 \leq x \leq 1.75$)), and polymer solid electrolyte.

The oxide-based electrolyte and sulfide-based solid electrolyte are inorganic solid electrolytes. Meanwhile, because a sulfide electrolyte reacts with lithium metal, the lithium metal cannot be used as an anode. Further, a polymer solid electrolyte melts or decomposes at a high operating temperature of the thermal battery and thus cannot be used. Additionally, a phosphoric acid-based solid electrolyte decomposes at a high operating temperature of the thermal battery and emits toxic gases and thus is limited in use. A composite solid electrolyte powder formed by adding and mixing molten salt to a solid electrolyte powder is used.

$Li_7La_3Zr_2O_{12}$ (LLZO), $Li_{0.33}La_{0.66}TiO_3$ (LLTO), and $Li_2ZrO_3$ (LZO), which are oxide-based solid electrolytes, and $Li_{7-x}PS_{6-x}Cl_x$, which is a relatively stable sulfide-based solid electrolyte, may be used.

Thereafter, the molten salt is melted by thermal treatment at a temperature higher than the melting point of the added molten salt by 50 to 150° C. and coated in a form of a salt film on the surface of a solid electrolyte to produce a composite solid electrolyte (step S320).

Alternatively, it is possible to use another method in which a molten salt electrolyte is dissolved by adding a liquid solute such as water or an organic solvent to produce a solution, and a solid electrolyte powder is then added to the solution, mixed, and dried, and finally residual salt is applied to the surface of the solid electrolyte to produce a composite solid electrolyte.

The molten salt may be LiCl, KCl, LiF, LiBr, or KBr, or a combination of eutectic compositions of other alkali metal/halogen compounds.

On the other hand, it is possible to use a method of immersing and mixing the solid electrolyte powder in a molten salt aqueous solution, followed by drying. Additionally, it is possible to use a method in which a molten salt electrolyte (10 to 70 wt. % compared to a solid electrolyte) is put in a container at room temperature, added gradually in a liquid solvent, such as water or organic solvent, and stirred well to dissolve completely, a solid electrolyte powder (30 to 90 wt % compared to the molten salt) is added to a resulting solution, mixed, and sufficiently dried at about 80° C. for about at least 48 hours, and then a composite solid electrolyte in a form that residual salt is applied to the surface of the solid electrolyte is produced.

It may be also possible that molten salt powder particles 502 and 503 are added in powder form to be interposed between solid electrolyte powder particles 501.

Figure 4:
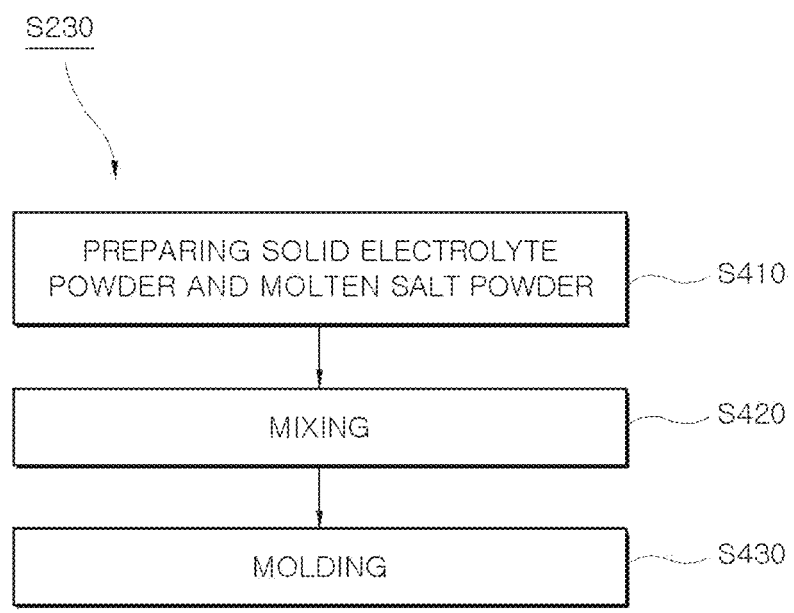
FIG. 4 is a view illustrating another example of a process diagram illustrating a step of forming a composite solid electrolyte layer illustrated in FIG. 2.

FIG. 4 is a view illustrating another example of a process diagram illustrating the step of forming a composite solid electrolyte layer (S230) illustrated in FIG. 2. Referring to FIG. 4, a solid electrolyte powder and a molten salt powder are respectively prepared (step S410). The molten salt powder is obtained by grinding a molten salt mass into a powder form.

Thereafter, the solid electrolyte powder and the molten salt powder are mixed and powder-molded to produce a composite solid electrolyte (step S430). That is, fine molten salt powder particles am interposed between solid electrolyte powder particles.

In particular, a conventional powder molding process can be utilized, thereby making it possible to provide high yield while enabling fast and inexpensive production. The molten salt powder and solid electrolyte powder are mixed and subjected to cold uniaxial pressing, or subjected to warm uniaxial pressing at a temperature equal to or less than the melting point of the molten salt to produce a composite solid electrolyte. This is described in Korean patent No. 10-1750203 (Method and apparatus for manufacturing of high density electrodes for reserve battery), previously filed by the applicant of the present invention. Therefore, a further description will be omitted.

FIG. 5 is a conceptual view illustrating the types of composite solid electrolytes in which molten salt and solid electrolyte am combined. Referring to FIG. 5, a first composite solid electrolyte 510 is a form in which molten salt powder particles 502 are combined on the surfaces of solid electrolyte powder particles 501. That is, coarse molten salt powder particles 502 are combined on the surfaces of the solid electrolyte powder particles 501. In detail, molten salt in a state of being interposed between solid electrolytes are weakly combined thereto after compression molding.

In this case, the coarse molten salt powder particles have a size of about +50 to −200 mesh. Mesh is a standard unit for categorizing the particle size of powder materials.

A second composite solid electrolyte 520 is a form in which molten salt powder particles 503 are combined on the surfaces of solid electrolyte powder particles 501. That is, fine molten salt powder particles 503 are combined on the surfaces of the solid electrolyte powder particles 501. In this case, the fine molten salt powder particles 503 have a size of about −300 mesh. That is, the fine molten salt powder particles 503 are smaller in size than the coarse molten salt powder particles 502.

A third composite solid electrolyte 530 is a form in which coarse molten salt powder particles 502 and fine molten salt powder particles 503 are combined on the surfaces of solid electrolyte powder particles 501. Also, the fine molten salt powder particles 503 may be combined on the surfaces of the solid electrolyte powder particles 501 and/or coarse molten salt powder particles 502.

The first to third composite solid electrolytes 510 to 530 are electrical insulators at room temperature, but when melting at high temperature, have excellent lithium ion transfer properties.

The molten salt powder particles 502 and 503 have an additive composition ratio of 10 to 70 wt %. The solid electrolyte 501 has a composition ratio of 30 to 90 wt. %. Therefore, while maintaining high output characteristics of the battery with the addition of the molten salt having a very high ionic conductivity, it is possible to provide a wide composition ratio (10 to 70 wt %) of molten salt, which significantly improves the stability of the battery, with the addition of a large amount of solid electrolyte compared to a conventional insulating ceramic binder (30 to 45 wt. %). In the case of including the fine molten salt powder particles 503 or the coarse molten salt powder particles 502, as well as including both the coarse powder and fine powder, the weight percent of the amount of molten salt added is the same. In detail, the molten salt has to melt at high temperature to contribute to ion conductivity, and thus the amount of addition is the same regardless of the particle size.

The first to third composite solid electrolytes 510 to 530 have a thickness of about 0.05 to 1.0 mm. Therefore, it is possible to reduce the internal resistance of a cell by using a thin composite electrolyte (0.05 to 1.0 mm) compared to a conventional electrolyte (0.4 to 1.0 mm). That is, it is possible to realize a thin-plate composite solid electrolyte.

FIG. 6 is a view illustrating a process of producing a composite solid electrolyte according to an embodiment of the present invention. Referring to FIG. 6, the fine molten salt powder particles 503 and the coarse molten salt powder particles 502 are partially melted with respect to the third composite solid electrolyte 530 so as to be coated on the surfaces of the solid electrolyte powder particles 501 (S610). That is, the molten salt powder particles 502 and 503 form a passivation layer. Thereafter, when the pyrotechnic heat source layer 150 of the thermal battery unit cell 100 is activated (S620), the solid electrolyte powder particles 501 come into contact with each other to activate ion and electron migration between the anode and the cathode. That is, when temperature is increased equal to or greater than the melting point of the molten salt electrolyte by a pyrotechnic heat source, a molten salt electrolyte having a very high conductivity compared to a solid electrolyte is formed. In other words, since the thermal battery becomes an excellent ion conductor only when the molten salt melts, a temperature rise equal to or greater than the melting point is required.

FIG. 7 is a view illustrating an example of comparing the discharge characteristics of a solid electrolyte molten salt according to an embodiment of the present invention and a conventional binder (MgO)-molten salt. Referring to FIG. 7, discharge characteristics 720 according to the present embodiment and discharge characteristics 710 according to a conventional example are compared. It can be seen that the discharge performance of a single cell added with the molten salt electrolyte and the solid electrolyte is superior to that of a single cell added with conventional molten salt electrolyte and insulating binder.

That is, a high stability composite solid electrolyte is possible. In the case of the conventional molten salt electrolyte, it is inevitable to keep the amount of added oxide insulator binder (MgO or the like) as low as 35 wt. % in order to maintain high ionic conductivity, resulting in poor operational stability of the battery at high temperature.

In the embodiment of the present invention, it was possible to greatly improve the stability of the battery by adding a large amount of solid electrolyte (equal to or greater than 35 wt. %) while maintaining high output characteristics of the battery by adding molten salt having a very high ionic conductivity. That is, since it is possible to add a large amount of solid electrolyte to hold the molten salt electrolyte flowing out, this can fundamentally prevent an increase in internal resistance due to a lack of electrolyte or short-circuit of electrodes, thereby greatly improving the operational stability of a high-temperature battery including a thermal battery.

Additionally, since the solid electrolyte having excellent ion conductivity is added as a binder, a higher amount than a conventional binder can be added, thereby making it possible to prevent the molten salt electrolyte from leaking even in harsh operating environments with very high vibration, shock, and acceleration. Therefore, it is possible to replace the molten salt electrolyte, which is limited in use fields to a disposable battery, with a composite electrolyte, thereby opening the possibility of application to a rechargeable battery that can be repeatedly charged and discharged for use.

Additionally, it is possible to realize a thermal battery without self-discharge. The solid electrolyte is characterized by having excellent ion conductivity even at room temperature, but at high temperature, the ion conductivity is further increased, and thus the solid electrolyte can find application in a thermal battery operating at high temperature. The thermal battery is required to not have any deterioration in performance, i.e., a decrease in discharge capacity, even when stored for a long time. Since the molten salt electrolyte interposed between the solid electrolytes has very good electrical insulating properties at room temperature, self-discharge rarely occurs even after a long period of time, and thus the molten salt electrolyte has many advantages as a reserve thermal battery component.

On the contrary, the solid electrolyte has a relatively high ionic conductivity ($10^{-2}$ to $10^{-5}$ S/cm) even at room temperature, and thus there is a fatal disadvantage that self-discharge cannot be avoided. In the embodiment of the present invention, various embodiments are proposed to reduce self-discharge, in which the molten salt is melted and applied to the surface of the solid electrolyte particles, the solid electrolyte powder is immersed and mixed in an aqueous solution of molten salt and dried, the molten salt is coated on the surfaces of the solid electrolyte particles, or fine molten salt powder particles are interposed between the solid electrolyte particles.

Additionally, it is possible to realize a high power composite electrolyte. In the shape according to the particle size of the molten salt powder illustrated in FIG. 5, internal resistance was low when adding molten salt (coarse powder) having a large particle size, molten salt (fine powder) having a small particle size, or a mixture of the coarse powder and fine power. This is interpreted as the melting of the molten salt having excellent conductivity effectively fills the empty space between the solid electrolytes to secure the ion migration passage. According to the embodiment of the present invention, it is possible to greatly improve the output characteristics of the battery by interposing the molten salt having excellent ion conductivity at high temperature between the surfaces of the solid electrolyte particles.

What is claimed is:

1. A composite solid electrolyte comprising:
molten salt powder particles having electrical insulating properties at room temperature; and
solid electrolyte powder particles on which surfaces thereof the molten salt powder particles are combined,
wherein the molten salt powder particles are added in form of powder particles to be interposed between the solid electrolyte powder particles,
wherein the solid electrolyte powder particles are garnet solid electrolytes,
wherein a composition ratio of the molten salt powder particles is 10 to 70 wt. %, and a composition ratio of the solid electrolyte powder particles is 30 to 90 wt. % to enhance the stability of a thermal cell,
wherein the molten salt powder particles comprise at least one of first molten salt powder particles and second molten salt powder particles smaller in size than the first molten salt powder particles,
wherein the first molten salt powder particles have a size of +50 to −200 mesh, and the second molten salt powder particles have a size of −325 mesh,
wherein the solid electrolyte has a thickness of 0.05 to 1.0 mm, and
wherein the molten salt powder particles become a molten salt electrolyte having conductivity when a pyrotechnic heat source layer is activated and thereby temperature rises equal to or greater than a melting point.

2. The composite solid electrolyte of claim 1, wherein the molten salt powder particles are mixed with the solid electrolyte powder particles in a form of an aqueous molten salt solution and then dried to be combined with the solid electrolyte powder particles.

3. The composite solid electrolyte of claim 1, wherein the molten salt powder particles and the solid electrolyte powder particles are mixed and subjected to warm uniaxial pressing at a temperature equal to or less than a melting point of the molten salt.

4. A thermal battery unit cell comprising:
a current collector layer,
an anode layer formed on top of the current collector layer,
a composite solid electrolyte layer formed on top of the anode layer,
a cathode layer formed on top of the composite solid electrolyte layer, and
a pyrotechnic heat source layer formed on top of the cathode layer,
wherein the composite solid electrolyte layer comprises molten salt powder particles and having electrical insulating properties at room temperature, and solid electrolyte powder particles on which surfaces thereof the molten salt powder particles are combined,
wherein the molten salt powder particles are added in form of powder particles to be interposed between the solid electrolyte powder particles,
wherein the solid electrolyte powder particles are garnet solid electrolytes,
wherein a composition ratio of the molten salt powder particles is 10 to 70 wt. %, and a composition ratio of the solid electrolyte powder particles is 30 to 90 wt. % to enhance the stability of a thermal cell,
wherein the molten salt powder particles comprise at least one of first molten salt powder particles and second molten salt powder particles smaller in size than the first molten salt powder particles,
wherein the first molten salt powder particles have a size of +50 to −200 mesh, and the second molten salt powder particles have a size of −325 mesh,
wherein the solid electrolyte has a thickness of 0.05 to 1.0 mm,
wherein the molten salt powder particles become a molten salt electrolyte having conductivity when a pyrotechnic heat source layer is activated and thereby temperature rises equal to or greater than a melting point.

5. The thermal battery unit cell of claim 4, wherein the anode layer is made of at least one of a lithium alloy and a lithium-iron mixture.

6. The thermal battery unit cell of claim 4, wherein the cathode layer is made of any one of sulfide, fluoride, and oxide.

7. A method of manufacturing a composite solid electrolyte, the method comprising:
preparing molten salt powder particles having electrical insulating properties at room temperature, and solid electrolyte powder particles; and
combining the molten salt powder particles on surfaces of the solid electrolyte powder particles to produce composite solid electrolytes,
wherein the molten salt powder particles are added in form of powder particles to be interposed between the solid electrolyte powder particles,
wherein the solid electrolyte powder particles are garnet solid electrolytes,
wherein a composition ratio of the molten salt powder particles is 10 to 70 wt. %, and a composition ratio of the solid electrolyte powder particles is 30 to 90 wt. % to enhance the stability of a thermal cell,
wherein the molten salt powder particles comprise at least one of first molten salt powder particles and second molten salt powder particles smaller in size than the first molten salt powder particles,
wherein the first molten salt powder particles have a size of +50 to −200 mesh, and the second molten salt powder particles have a size of −325 mesh,
wherein the solid electrolyte has a thickness of 0.05 to 1.0 mm,
wherein the molten salt powder particles become a molten salt electrolyte having conductivity when a pyrotechnic heat source layer is activated and thereby temperature rises equal to or greater than a melting point.

8. A method of manufacturing a composite solid electrolyte, the method comprising:
preparing molten salt powder particles having electrical insulating properties at room temperature, and solid electrolyte powder particles;
dissolving molten salt powder particles by adding a liquid solute which is water or an organic solvent to produce a solution; and
mixing the solid electrolyte powder particles into the solution, followed by drying to produce composite solid electrolytes,
wherein the molten salt powder particles are added in form of powder particles to be interposed between the solid electrolyte powder particles,
wherein the solid electrolyte powder particles are garnet solid electrolytes,
wherein a composition ratio of the molten salt powder particles is 10 to 70 wt. %, and a composition ratio of the solid electrolyte powder particles is 30 to 90 wt. % to enhance the stability of a thermal cell,
wherein the molten salt powder particles comprise at least one of first molten salt powder particles and second molten salt powder particles smaller in size than the first molten salt powder particles,
wherein the first molten salt powder particles have a size of +50 to −200 mesh, and the second molten salt powder particles have a size of −325 mesh,
wherein the solid electrolyte has a thickness of 0.05 to 1.0 mm,
wherein the molten salt powder particles become a molten salt electrolyte having conductivity when a pyrotechnic heat source layer is activated and thereby temperature rises equal to or greater than a melting point.

\* \* \* \* \*